(12) United States Patent
Fuse et al.

(10) Patent No.: US 7,076,166 B2
(45) Date of Patent: Jul. 11, 2006

(54) LOW-COST OPTICAL BURST TRANSMISSION SYSTEM, APPARATUS, AND METHOD

(75) Inventors: Masaru Fuse, Toyonaka (JP); Toru Shiozaki, Kobe (JP); Yoshikazu Ishii, Yokohama (JP); Hiroaki Asano, Yokohama (JP); Kuniaki Utsumi, Sanda (JP); Katsumi Iwatsuki, Yokohama (JP); Hitoshi Uematsu, Zushi (JP); Shigeru Kuwano, Yokohama (JP); Mitsuhiro Teshima, Yokosuka (JP)

(73) Assignees: Matsushita Electric Industrial Co., Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 731 days.

(21) Appl. No.: 10/212,389

(22) Filed: Aug. 5, 2002

(65) Prior Publication Data

US 2003/0030877 A1 Feb. 13, 2003

(30) Foreign Application Priority Data

Aug. 7, 2001 (JP) ............................. 2001-239221

(51) Int. Cl.
*H04J 14/00* (2006.01)
(52) U.S. Cl. ............................. 398/49; 398/48; 398/16; 398/24; 398/46

(58) Field of Classification Search ................... 398/1, 398/91, 212, 48, 49, 43; 385/16, 24, 46
See application file for complete search history.

(56) References Cited

U.S. PATENT DOCUMENTS 5,717,795 A * 2/1998 Sharma et al. ................. 385/24
5,815,296 A * 9/1998 Kubota ......................... 398/91

\* cited by examiner

*Primary Examiner*—David C. Payne (57) ABSTRACT

This invention discloses an optical burst transmission system in which an optical generator generates Type 1 lightwaves having different wavelengths corresponding to transmission lines and having undergone intensity modulation with obtained data; a broad spectrum optical generator generates, by incorporating Type 2 lightwaves, a Type 3 lightwave using a fewer light emitting devices than the number of the Type 1 lightwaves, each Type 2 lightwaves having a corresponding wavelength apart from Type 1 lightwave's wavelength with an FSR interval and having undergone the intensity modulation with clock signals; an optical multiplexer multiplexes the Type 1 and Type 3 lightwaves to output the combination to each transmission line; and an optical routing unit extracts, from the combination, pairs of one Type 1 lightwave and one Type 2 lightwave having the corresponding wavelength, and guides pairs to each transmission line corresponding to the Type 1 lightwave's wavelength in each pair.

18 Claims, 6 Drawing Sheets

FIG.1

FIG.2A
OUTPUT FROM THE OPTICAL MULTIPLEXER

FIG.2B
OPTICAL FILTER TRANSMISSION CHARACTERISTICS AT THE OPTICAL ROUTING UNIT

FIG.2C
OUTPUT FROM THE FIRST OUTPUT PORT

FIG.3

FIG.4A OUTPUT FROM THE OPTICAL MULTIPLEXER

FIG.4B OPTICAL FILTER TRANSMISSION CHARACTERISTICS AT THE OPTICAL ROUTING UNIT

FIG.4C OUTPUT FROM THE FIRST OUTPUT PORT

FIG.6

LOW-COST OPTICAL BURST TRANSMISSION SYSTEM, APPARATUS, AND METHOD

This application is based on an application No. 2001-239221 filed in Japan, the content of which is hereby incorporated by reference.

BACKGROUND OF THE INVENTION (1) Field of the Invention

The present invention relates to an optical burst transmission system for intermittently transmitting data in optical signals, especially multiplexing and transmitting clock signals along with transmitting data.

(2) Description of the Related Art

Figure 1:
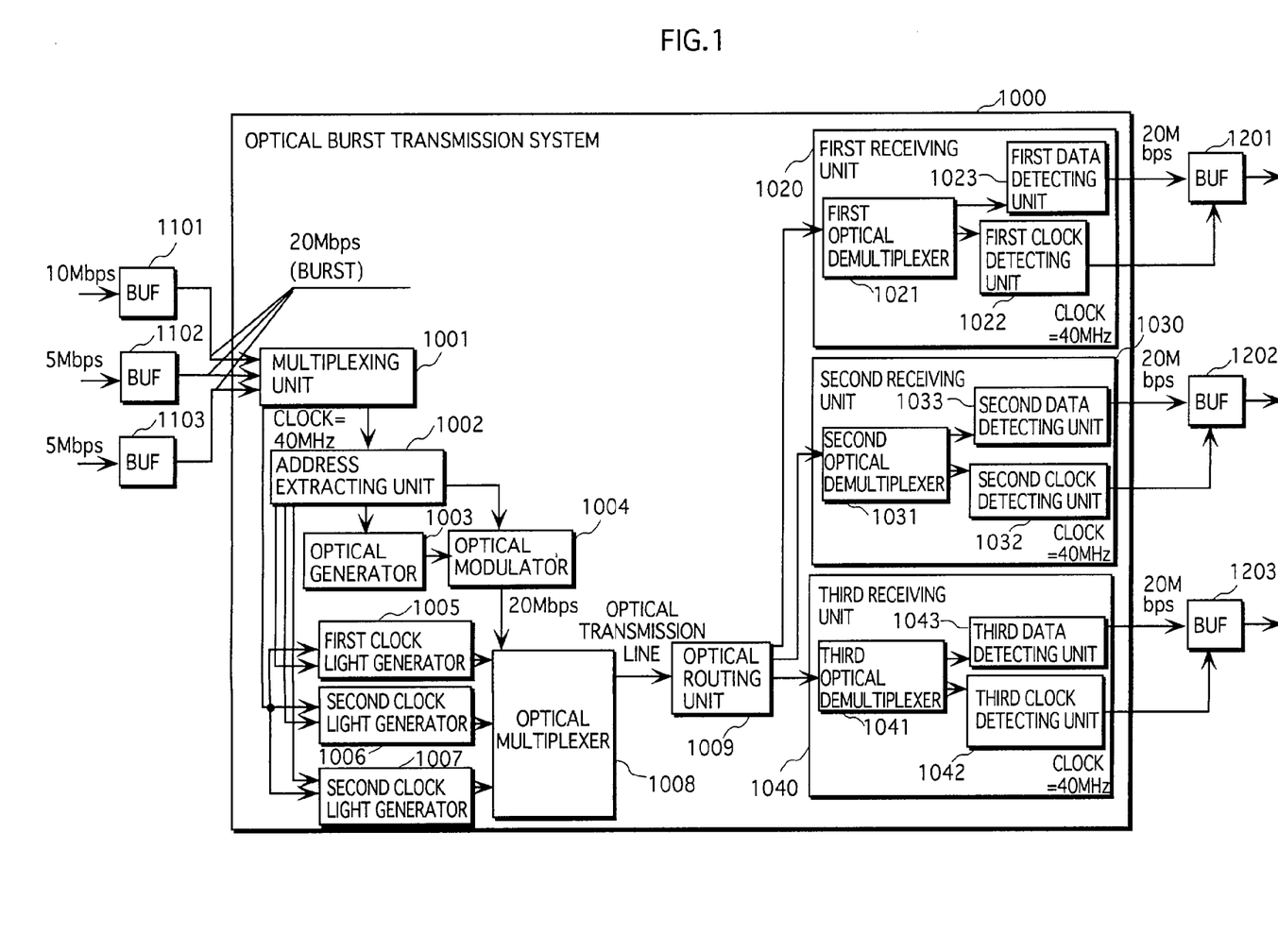
FIG. 1 is a functional block diagram of an optical burst transmission system of the prior art.

FIG. 1 is a functional block diagram for an optical burst transmission system 1000 in the prior art. The optical burst transmission system 1000 comprises a multiplexing unit 1001, an address extracting unit 1002, an optical generator 1003, an optical modulator 1004, a first clock light generator 1005, a second clock light generator 1006, a third clock light generator 1007, an optical multiplexer 1008, an optical routing unit 1009, a first receiving unit 1020, a second receiving unit 1030, and a third receiving unit 1040.

FIG. 1 also shows, in addition to the aforementioned functional part, buffers 1101, 1102, 1103, 1201, 1202, and 1203 for storing data temporarily when data is transferred between the optical burst transmission system 1000 in the prior art and other input/output equipment.

The multiplexing unit 1001 reads from the buffers 1101, 1102, 1103 a plurality of data taking the form of packets, for example, three kinds of data to be transmitted to different destinations, Data A, Data B, and Data C, and multiplexes them into a transport stream.

The multiplexing unit 1001 also outputs a clock signal that is synchronous with the transfer rate of the multiplexed data to the first clock light generator 1005, the second clock light generator 1006, and the third clock light generator 1007.

The address extracting unit 1002 extracts address information to show the destinations of each data from the packet header of the multiplexed data.

The optical generator 1003 generates a kind of lightwaves each of which has a wavelength that is unique to each piece of the extracted address information so that the lightwaves function as data transmitting waves.

For each of the data packets, the optical modulator 1004 modulates the intensity of the lightwaves outputted from the optical generator 1003 according to the data included in each of the data packets, and outputs the lightwaves as "data light."

The first clock light generator 1005, the second clock light generator 1006, and the third clock light generator 1007 generate another kind of lightwaves each of which has a wavelength that is unique to each of the destinations indicated by the address information and is different from that of the lightwaves generated by the optical generator 1003 so that this kind of lightwaves function as transmitting waves for the clock signals received from the multiplexing unit 1001 (hereafter this kind of lightwaves is referred to as "clock light").

In other words, in the aforementioned case, three light emitting devices are needed for generating, in parallel, three lightwaves of clock light with independent wavelength for each of the destinations.

The optical multiplexer 1008 multiplexes the data light and the clock light and outputs the multiplexed combination to an optical transmission line such as a fiber optic cable.

The optical routing unit 1009 receives the combination of lightwaves from the optical transmission line and separates them into pairs of data light and clock light whose wavelengths are apart from each other with a predetermined interval called FSR (Free Spectral Range). The optical routing unit 1009 then guides the pairs of lightwaves to transmission lines each of which corresponds to the wavelengths of the pairs of lightwaves.

More specifically, for example, if the setting of the optical routing unit 1009 is such that only lightwaves with the wavelengths of λ10 and λ13 which are apart from each other with an FSR interval can be outputted from the first output port leading to the first receiving unit 1020, then the optical generator 1003 adjusts to λ13 the wavelength of Data A whose destination is the first receiving unit 1020, and the first clock light generator 1005 whose fixed wavelength is λ10 generates clock light to be used as the clock signal for Data A. Thus, the data light and the clock light for Data A are transmitted to the first receiving unit 1020.

Also, for other Data B and Data C, in the same manner, data light and clock light are generated with wavelengths that correspond to the destinations indicated by the address information included in these data, and transmitted to the destination receiving units.

The first receiving unit 1020 comprises a first optical demultiplexer 1021, a first clock detecting unit 1022, and a first data detecting unit 1023; the second receiving unit 1030 comprises a second optical demultiplexer 1031, a second clock detecting unit 1032, and a second data detecting unit 1033; and the third receiving unit 1040 comprises a third optical demultiplexer 1041, a third clock detecting unit 1042, and a third data detecting unit 1043.

Since the first receiving unit 1020, the second receiving unit 1030, and the third receiving unit 1040 have the same function, the following explanation uses the first receiving unit 1020 as an example.

The first optical demultiplexer 1021 receives the combination of lightwaves composed of the data light and the corresponding clock light of the data whose destination is the first optical demultiplexer 1021, and demultiplexes the combination into data light and clock light and outputs them.

Figure 2A:
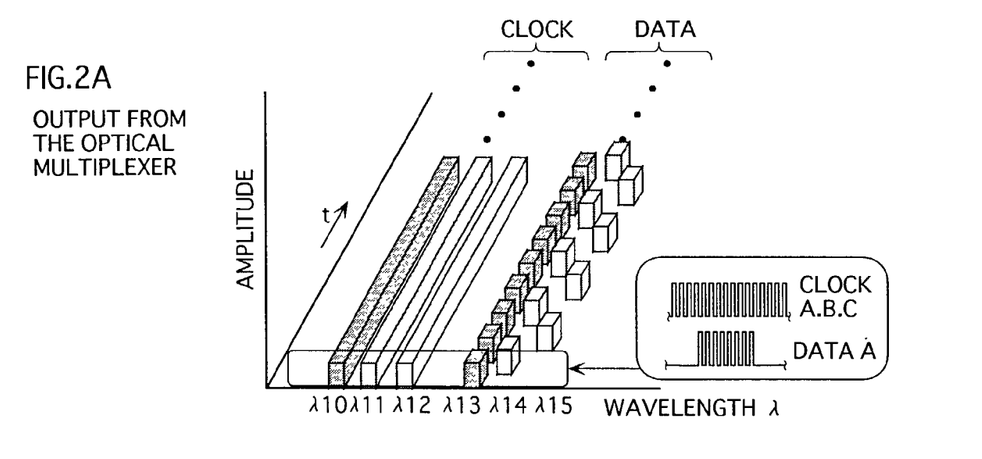
FIG. 2A shows how the data and the clock signals outputted from the optical multiplexer are transmitted in an optical burst transmission system of the prior art.

The first clock detecting unit 1022 converts the demultiplexed clock light into a clock signal. The first data detecting unit 1023 converts the demultiplexed data light into data in the form of an electric signal. This data is stored in the buffer 1201 according to the converted clock signal. FIG. 2A shows how the data and the clock signal outputted from the optical multiplexer 1008 are transmitted.

The optical multiplexer 1008 outputs data light and clock light each of which has a wavelength that is unique and corresponding to the address information; for example, lightwaves with the wavelength λ10 (clock light) and λ13 (data light) for Data A whose destination is the first receiving unit 1020, lightwaves with the wavelengths λ11 and λ14 for Data B whose destination is the second receiving unit 1030, and lightwaves with the wavelengths λ12 and λ15 for Data C whose destination is the third receiving unit 1040.

Figure 2B:
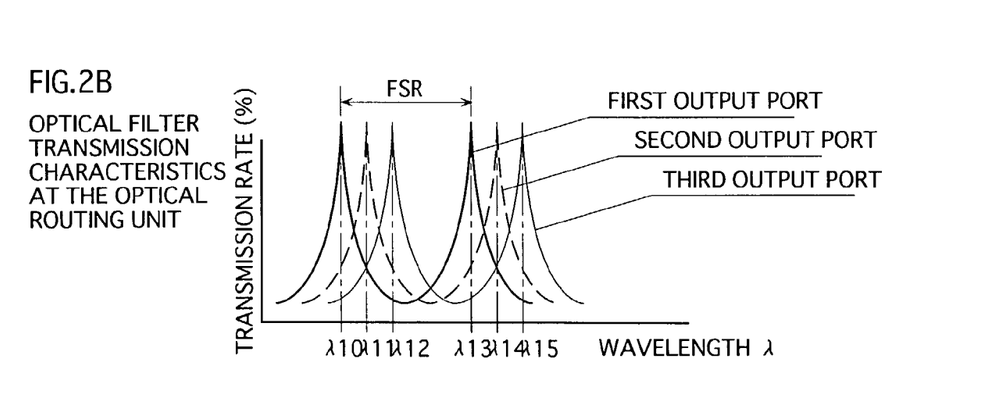
FIG. 2B shows the optical filter transmission characteristics at the optical routing unit in an optical burst transmission system of the prior art.

FIG. 2B shows the optical filter transmission characteristics at the optical routing unit 1009. The optical routing unit 1009 has certain points where the transmission intensity becomes the maximum for such wavelengths that are apart from each other with a predetermined interval, i.e. an FSR interval (hereafter, such wavelengths are referred to as "the peak transmission wavelengths"). The optical routing unit 1009 has a plurality of output ports for pairs of wavelengths whose intervals are the same FSR values and yet their absolute values of the peak transmission wavelengths are different from each other.

For instance, the first output port has its peak transmission wavelength at the wavelengths $\lambda 10$ and $\lambda 13$, and outputs only such lightwaves with the wavelengths at peak transmission wavelength.

In the same manner, the second output port outputs only such lightwaves with the wavelengths $\lambda 11$ and $\lambda 14$ which are at the two adjacent peak transmission wavelengths; and the third output port outputs only such lightwaves with the wavelengths $\lambda 12$ and $\lambda 15$ which are the two adjacent peak transmission wavelengths.

The destinations indicated by the address information and the output ports correspond one on one.

Figure 2C:
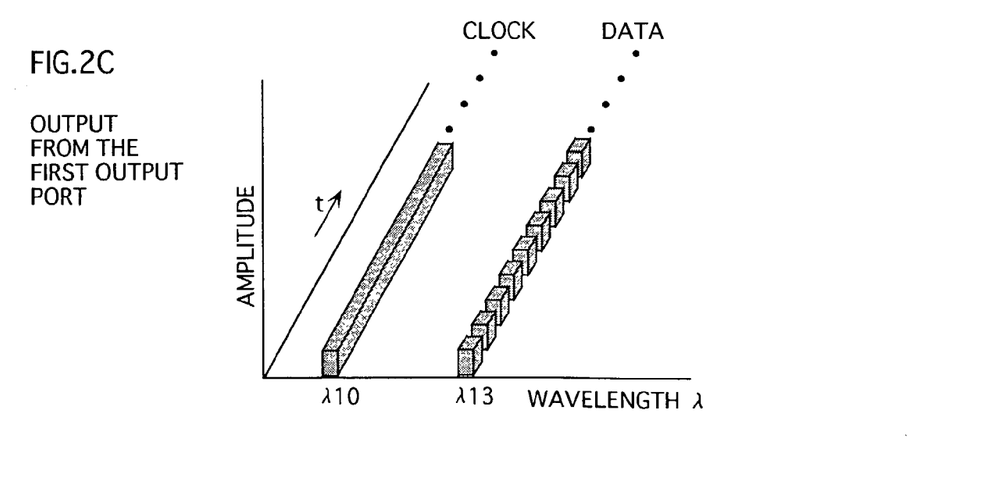
FIG. 2C shows the wavelength characteristics of the lightwaves outputted from the first output port of the optical routing unit in an optical burst transmission system of the prior art.

FIG. 2C shows the wavelength characteristics of the lightwaves outputted from the first output port. Because of the aforementioned features of the optical routing unit 1009, only lightwaves with the wavelengths $\lambda 10$ and $\lambda 13$ are outputted from the first output port leading to the first receiving unit 1020.

Here, the lightwave with the wavelength $\lambda 10$ is clock light and the lightwave with the wavelength $\lambda 13$ is data light.

Thus, the optical burst transmission system 1000 comprises, on an optical transmission line, the optical routing unit 1009 whose function is to use the wavelengths of the data transmitting lightwaves as an address for indicating the destination and to separate and output the optical signals from different output ports according to the wavelengths of the inputted lightwaves. This way, the optical burst transmission system 1000 performs routing, i.e. switching paths, in the optical area and makes it possible to transmit data at high speed and in a large quantity.

The optical burst transmission system 1000 of the prior art, however, has a problem that can be explained as follows: The optical routing unit has a feature to transmit only such pairs of lightwaves that have specific wavelengths different from each other. As shown in FIG. 1, when clock signals need to be transmitted to all destinations, there need to be a light source transmitting clock signals with a certain wavelength setting for every destination of the data, namely for every receiving terminals. Consequently, the more receiving terminals there are, the higher the costs of the transmission equipment, especially of the light sources will be.

SUMMARY OF THE INVENTION

It is a first object of the present invention, in view of the aforementioned problem, to provide an optical burst transmission system in which the costs do not increase so much even if the number of the receiving terminals increases.

It is a second object of the present invention to provide an optical burst transmission apparatus of which the costs do not increase so much even if the number of the receiving terminals increases.

Further, it is a third object of the present invention to provide a method for optical burst transmission in which the costs do not increase so much even if the number of the receiving terminals increases.

The first object can be achieved by an optical burst transmission system that transmits lightwaves having a plurality of pieces of data therein through transmission lines to destinations of the plurality of pieces of data, comprising: a data obtaining means for obtaining the plurality of pieces of data in sequence; a first optical signal generating means for generating Type 1 lightwaves from each piece of the data obtained, each Type 1 lightwave having a Type 1 wavelength that is unique to and corresponds to each of the destinations of each piece of the data, and having undergone an intensity modulation process according to a data value of each piece of the data; a second optical signal generating means for generating, by incorporating at least Type 2 lightwaves, a Type 3 lightwave using a smaller number of light emitting devices than the number of the Type 1 lightwaves generated by the first optical signal generating means, each of the Type 2 lightwaves (i) having a Type 2 wavelength that corresponds to each Type 1 wavelength and is apart from each Type 1 wavelength with an interval expressed as "FSR multiplied by M", wherein the FSR stands for Free Spectral Range and M is a natural number and (ii) having undergone the intensity modulation process according to a clock signal corresponding to the plurality of pieces of data; an outputting means for outputting a combination of the Type 1 lightwaves and the Type 3 lightwave; an optical routing means for receiving the combination of the lightwaves and extracting pairs of the lightwaves from the combination so that each pair is made up of one Type 1 lightwave and one particular Type 2 lightwave having the Type 2 wavelength, and guiding each pair to each of the transmission lines that is unique to and respectively corresponds to each of the Type 1 wavelengths of the Type 1 lightwaves extracted.

With the stated arrangement, compared to the prior art in which a light emitting device is needed for every destination, the costs do not increase so much even if the number of the receiving terminals increases, because it is possible to make the number of the light emitting devices smaller than the number of the transmission lines corresponding to the number of the Type 1 lightwaves, i.e. the number of the receiving terminals.

Here, the Type 3 lightwave may include a lightwave having a wavelength band covering all wavelengths from a minimum Type 2 wavelength to a maximum Type 2 wavelength.

With the stated arrangement, it is easier to choose a light emitting device to be used because there is no need to adjust the wavelengths of each Type 2 lightwave and it is good enough to have a light emitting device that emits lightwaves with a wavelength band.

Here, each of the light emitting devices used by the second optical signal generating means may generate two or more Type 2 lightwaves having different wavelengths.

With the stated arrangement, it is easier to choose light emitting devices because it is possible to assign different wavelength bands to each of the light emitting devices.

Here, the number of the light emitting devices used by the second optical signal generating means may be one.

With the stated arrangement, it is possible to further reduce the costs of the second optical signal generating means.

Here, The optical burst transmission system may further comprise: a frequency dividing means for dividing a frequency of the clock signal into 1/N, wherein N is a natural number; and a reproducing means for (i) receiving the pair made up of the Type 1 lightwave and the Type 2 lightwave via one of the transmission lines, (ii) multiplying by N the frequency of the clock signal transmitted in the Type 2 lightwave, and (iii) reproducing the plurality of pieces of data by discriminating each piece of the data transmitted in the Type 1 lightwave using the clock signal whose frequency has been multiplied, wherein each of the Type 2 lightwaves incorporated into the Type 3 lightwave by the second optical signal generating means has undergone the intensity modulation process according to the clock signal whose frequency had been divided by the frequency dividing means.

With the stated arrangement, it is possible to use a less expensive light emitting device because the performance i.e. the band required for the light emitting device is less restricted.

Here, the first optical signal generating means may generate the Type 1 lightwaves using a Distributed Bragg Reflector Laser, a Super Structure Grating Distributed Bragg Reflector Laser, a Sampled Grating Distributed Bragg Reflector Laser, or a Grating-assisted Codirectional Coupler with Sampled Reflector Laser as a light source that includes the light emitting devices.

With the stated arrangement, it is possible to generate lightwaves with a specific wavelength.

Here, the second optical signal generating means may generate the Type 3 lightwave using a Super Luminescent Diode or a Light Emission Diode as the light emitting devices.

With the stated arrangement, it is possible to generate the Type 3 lightwaves.

Here, the optical routing means may comprise an Arrayed Waveguide Grating and extract the pairs of the lightwaves by using the Arrayed Waveguide Grating.

This way it is possible to extract the pairs of lightwaves.

The second object can be achieved by an optical burst transmission apparatus transmitting a combination of lightwaves to a component that (a) receives the combination of lightwaves, (b) extracts pairs of the lightwaves from the combination so that each pair is made up of (i)one Type 1 lightwave having a Type 1 wavelength that is unique to and corresponds to a transmission line leading to a destination of each of a plurality of pieces of data and (ii) one particular Type 2 lightwave having a Type 2 wavelength that corresponds to the Type 1 wavelength and is apart from the Type 1 wavelength with an interval expressed as "FSR multiplied by M", wherein the FSR stands for Free Spectral Range and M is a natural number, and (c) guides each pair to each transmission line that is unique and respectively corresponds to each Type 1 wavelength of the Type 1 lightwaves extracted, the optical burst transmission apparatus comprising: a data obtaining means for obtaining the plurality of pieces of data in sequence; a first optical signal generating means for generating the Type 1 lightwaves from each piece of the data obtained, each Type 1 lightwave having the Type 1 wavelength that is unique to and corresponds to each destination of each piece of the data, and having undergone an intensity modulation process according to a data value of each piece of the data; a second optical signal generating means for generating, by incorporating at least the Type 2 lightwaves, a Type 3 lightwave using a smaller number of light emitting devices than the number of the Type 1 lightwaves generated by the first optical signal generating means, each of the Type 2 lightwaves having the Type 2 wavelength that corresponds to each Type 1 wavelength, and having undergone the intensity modulation process according to a clock signal corresponding to the plurality of pieces of data; an outputting means for outputting the combination of the Type 1 lightwaves and the Type 3 lightwave to the component.

With the stated arrangement, compared to the prior art in which a light emitting device is needed for every destination, the costs do not increase so much even if the number of the receiving terminals increases, because it is possible to make the number of the light emitting devices smaller than the number of the transmission lines corresponding to the number of the Type 1 lightwaves, i.e. the number of the receiving terminals.

Here, the Type 3 lightwave may include a lightwave having a wavelength band covering all wavelengths from a minimum Type 2 wavelength to a maximum Type 2 wavelength.

With the stated arrangement, it is easier to choose a light emitting device to be used because there is no need to adjust the wavelengths of each Type 2 lightwave and it is good enough to have a light emitting device that emits lightwaves with a wavelength band.

Here, each of the light emitting devices used by the second optical signal generating means may generate two or more Type 2 lightwaves having different wavelengths.

With the stated arrangement, it is easier to choose light emitting devices because it is possible to assign different wavelength bands to each of the light emitting devices.

Here, the optical burst transmission apparatus may further comprise: a frequency dividing means for dividing a frequency of the clock signal into 1/N, wherein N is a natural number, wherein each of the Type 2 lightwaves incorporated into the Type 3 lightwave by the second optical signal generating means has undergone the intensity modulation process according to the clock signal whose frequency had been divided by the frequency dividing means.

With the stated arrangement, it is possible to use a less expensive light emitting device because the performance i.e. the band required for the light emitting device is less restricted.

Here, a minimum Type 1 wavelength may be apart from a maximum Type 1 wavelength with an interval either equal or subequal to the FSR.

With the stated arrangement, it is possible to transmit data efficiently by not wasting any part of the wavelength band of the lightwaves.

Here, a minimum Type 1 wavelength may be apart from a maximum Type 1 wavelength with an interval either equal to or smaller than the FSR.

With the stated arrangement, it is possible to transmit data in high quality because the interference between the Type 1 lightwaves and the Type 3 lightwaves can be avoided.

Here, the first optical signal generating means may generate the Type 1 lightwaves using a Distributed Bragg Reflector Laser, a Super Structure Grating Distributed Bragg Reflector Laser, a Sampled Grating Distributed Bragg Reflector Laser, or a Grating-assisted Codirectional Coupler with Sampled Reflector Laser as a light source that includes the light emitting devices.

With the stated arrangement, it is possible to generate lightwaves with a specific wavelength.

Here, the second optical signal generating means may generate the Type 3 lightwave using a Super Luminescent Diode or a Light Emission Diode as the light emitting devices.

With the stated arrangement, it is possible to generate the Type 3 lightwaves.

The third object can be achieved by an optical burst transmission method for transmitting lightwaves that have a plurality of pieces of data therein through transmission lines to destinations of the plurality of pieces of data, comprising: a data obtaining step for obtaining the plurality of pieces of data in sequence; a first optical signal generating step for generating Type 1 lightwaves from each piece of the data obtained, each Type 1 lightwave having a Type 1 wavelength that is unique to and corresponds to each of the destinations of each piece of the data, and having undergone an intensity modulation process according to a data value of each piece of the data; a second optical signal generating step for generating, by incorporating at least Type 2 lightwaves, a Type 3 lightwave using a smaller number of light emitting devices than the number of the Type 1 lightwaves generated in the first optical signal generating step, each of the Type 2 lightwaves (i) having a Type 2 wavelength that corresponds to each Type 1 wavelength and is apart from each Type 1 wavelength with an interval expressed as "FSR multiplied by M", wherein the FSR stands for Free Spectral Range and M is a natural number and (ii) having undergone the intensity modulation process according to a clock signal corresponding to the plurality of pieces of data; an outputting step for outputting a combination of the Type 1 lightwaves and the Type 3 lightwave to optical transmission lines; an optical routing step for receiving the combination of the lightwaves via the optical transmission lines and extracting pairs of the lightwaves from the combination so that each pair is made up of one Type 1 lightwave and one particular Type 2 lightwave having the corresponding Type 2 wavelength, and guiding each pair to each of the transmission lines that is unique to and respectively corresponds to each of the Type 1 wavelengths of the Type 1 lightwaves extracted.

With the stated arrangement, compared to the prior art in which a light emitting device is needed for every destination, the costs do not increase so much even if the number of the receiving terminals increases, because it is possible to make the number of the light emitting devices smaller than the number of the transmission lines corresponding to the number of the Type 1 lightwaves, i.e. the number of the receiving terminals.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

First Embodiment

Figure 3:
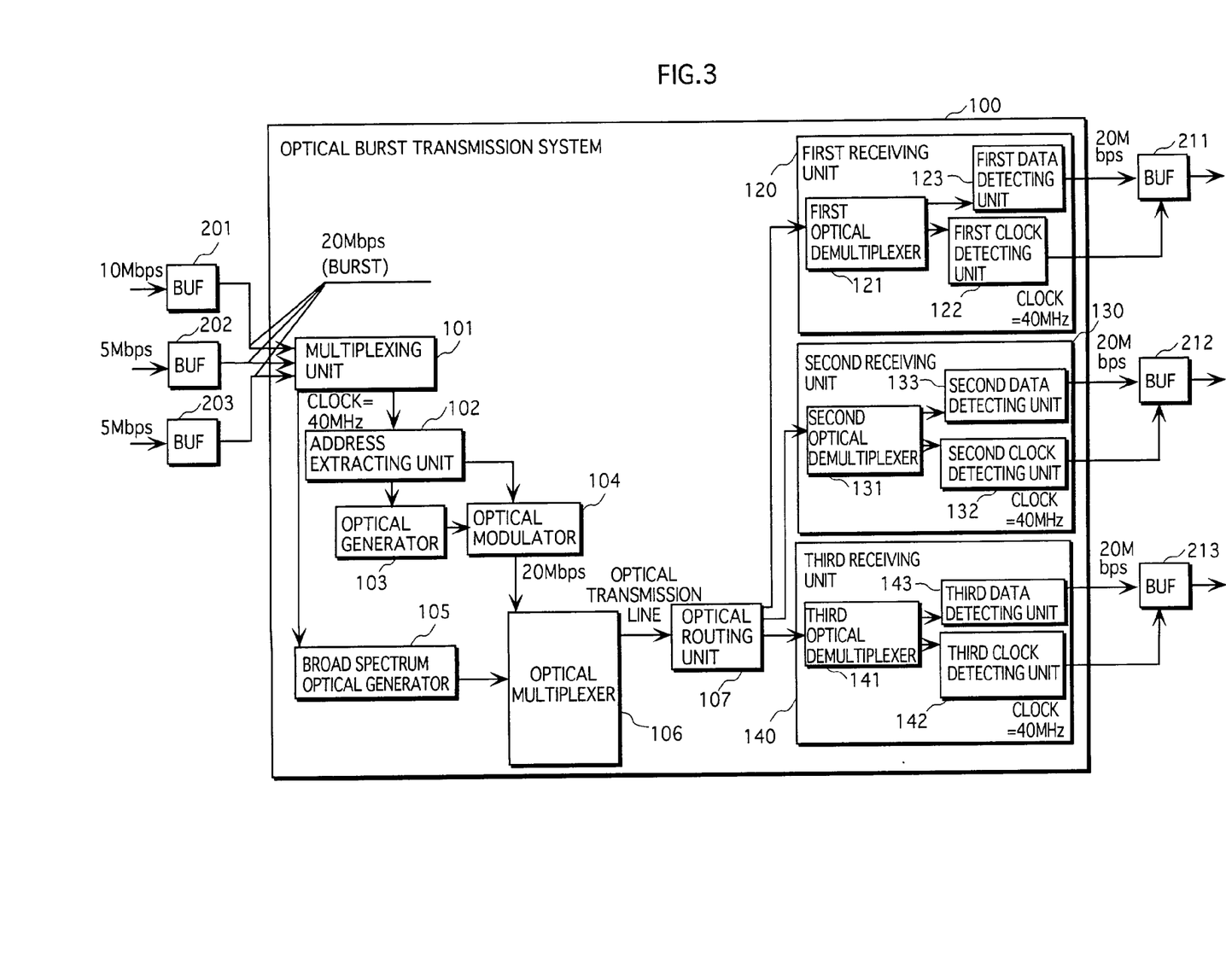
FIG. 3 is a functional block diagram of an optical burst transmission system in the first embodiment of the present invention.

FIG. 3 is a functional block diagram of the optical burst transmission system 100 in the first embodiment of the present invention.

The optical burst transmission system 100 is a system that converts electric signals into optical signals in order to transfer data at high speed and in a large quantity, and comprises a multiplexing unit 101, an address extracting unit 102, an optical generator 103, an optical modulator 104, a broad spectrum optical generator 105, an optical multiplexer 106, an optical routing unit 107, a first receiving unit 120, a second receiving unit 130, and a third receiving unit 140.

FIG. 3 also shows, in addition to the aforementioned functional part, buffers 201, 202, 203, 211, 212, and 213 for storing data temporarily when data is transferred between the optical burst transmission system 100 and other equipment.

The multiplexing unit 101 reads from the buffers 201, 202, 203 a plurality of data taking the form of packets, for example, three kinds of data to be transmitted to different destinations, Data A, Data B, and Data C, and multiplexes them into a transport stream. The multiplexing unit 101 also outputs a clock signal that is synchronous with the transfer rate of the multiplexed data to the broad spectrum optical generator 105.

More specifically, for example, when data is transmitted at a speed of 20 Mbps, the multiplexing unit 101 outputs a clock signal at 40 MHz whose phase is synchronous with that of the outputted data signal.

The address extracting unit 102 extracts address information to show the destinations of each of the data packets from the packet header of the multiplexed data.

The optical generator 103 is a DBR (Distributed Bragg Reflector) laser that generates a kind of lightwaves each of which has a wavelength that is unique to each piece of the extracted address information, and outputs to the optical modulator 104 the lightwaves so that the lightwaves function as data packet transmitting waves.

More specifically, the optical generator 103 generates a transmitting wave, i.e. data light, with the wavelength $\lambda 4$, for Data A whose destination is the first receiving unit 120; data light with the wavelength $\lambda 5$ for Data B whose destination is the second receiving unit 130, data light with the wavelength $\lambda 6$ for Data C whose destination is the third receiving unit 140 respectively.

Here, a wavelength band of data light that covers all of $\lambda 4$, $\lambda 5$ and $\lambda 6$ is referred to as a first wavelength band for convenience sake.

For each of the data packets, the optical modulator 104 modulates the intensity of the lightwaves outputted from the optical generator 103 according to the data included in each of the data packets, and outputs the lightwaves as "data light."

The broad spectrum optical generator 105 has a light emitting device, such as an LED (Light Emitting Diode), which emits lightwaves with a broad wavelength band from a wavelength λa to a wavelength λb (hereafter referred to as a second wavelength band), and converts the clock signal taking the form of an electric signal received from the multiplexing unit into an optical signal, and then outputs it to the optical multiplexer 106 as clock light.

The optical multiplexer 106 multiplexes the data light and the clock light outputted from the optical modulator 104 and outputs the multiplexed combination to an optical transmission line.

The optical routing unit 107 is an AWG (Arrayed Waveguide Grating) that guides lightwaves with three pairs of wavelengths, among which each pair has the same FSR value and yet the absolute values of the peak transmission wavelengths are different from each other, to three different output ports respectively.

For example, the optical routing unit 107 guides to the first output port only such lightwaves with the wavelengths λ1 and λ4, that are two peak transmission wavelengths with an FSR interval; and guides to the second output port only such lightwaves with the wavelengths λ2 and λ5 that are in the same relationship; and guides to the third output port only lightwaves with the wavelengths λ3 and λ6 that are in the same relationship.

The wavelengths λ1, λ2 and λ3 have been set so that λa<λ1, λ2, λ3<λb holds true wherein the wavelengths λa and λb are at both ends of the wavelength band of the clock light outputted from the broad spectrum generator 105.

The following explains the first receiving unit 120, the second receiving unit 130 and the third receiving unit 140; however, detailed explanation will be omitted since their functions are the same as those in the prior art.

The first receiving unit 120 comprises a first optical demultiplexer 121, a first clock detecting unit 122, and a first data detecting unit 123; the second receiving unit 130 comprises a second optical demultiplexer 131, a second clock detecting unit 132, and a second data detecting unit 133; the third receiving unit 140 comprises a third optical demultiplexer 141, a third clock detecting unit 142, and a third data detecting unit 143.

Since the first receiving unit 120, the second receiving unit 130 and the third receiving unit 140 comprise the same functional parts and have the same function, the following explanation uses the first receiving unit 120 as an example.

The first optical demultiplexer 121 is connected to the first output port of the optical routing unit 107 via an optical transmission line such as a fiber optic cable, and comprises a filter for sorting out lightwaves with a specific wavelength. For instance, the first optical demultiplexer 121 guides only such a lightwave with the wavelength λ1 to the first clock detecting unit 122, and only such a lightwave with the wavelength λ4 to the second data detecting unit 133.

The first clock detecting unit 122 converts the lightwave received from the first optical demultiplexer 121 into an electric signal and reproduces a clock signal.

The first data detecting unit 123 converts the lightwave received from the first optical demultiplexer 121 into an electric signal and reproduces data in the form of data packets.

This data is stored in the buffer 211 with a trigger being the reproduced clock signal.

Other functional parts that function in the same way as the first optical demultiplexer 121 are the second optical demultiplexer 131 connected to the second output port of the optical routing unit 107, and the third optical demultiplexer 141 connected to the third output port of the optical routing unit 107; however, the wavelength values of the lightwaves demultiplexed by those optical demultiplexers are different from one another.

For example, the second optical demultiplexer 131 guides such a lightwave with the wavelength λ5 to the second data detecting unit 133, and such a lightwave with the wavelength λ2 to the second clock detecting unit 132.

The third optical demultiplexer 141 guides such a lightwave with the wavelength λ6 to the third data detecting unit 143, and such a lightwave with the wavelength λ3 to the third clock detecting unit 142.

The second clock detecting unit 132 and the third clock detecting unit 142 function in the same way as the first clock detecting unit 122.

Also, the second data detecting unit 133 and the third data detecting unit 143 function in the same way as the first data detecting unit 123.

Data

The following is an explanation of how a clock signal and data are transmitted in the optical burst transmission system 100 arranged as above.

Figure 4A:
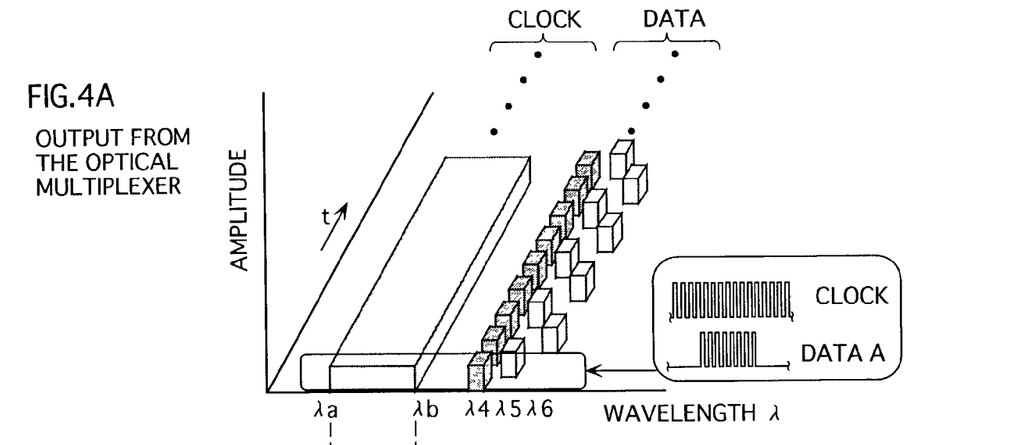
FIG. 4A shows how the data and the clock signal outputted from the optical multiplexer are transmitted in an optical burst transmission system in the first embodiment of the present invention.

FIG. 4A shows how the data and the clock signal outputted from the optical multiplexer 106 are transmitted. The combination of lightwaves outputted from the optical multiplexer 106 is made up of clock light and data light, clock light having the second wavelength band, i.e. a wavelength band from λa to λb, and data light having the wavelengths λ4, λ5, and λ6. This data light is multiplexed by time-division multiplexing.

Figure 4B:
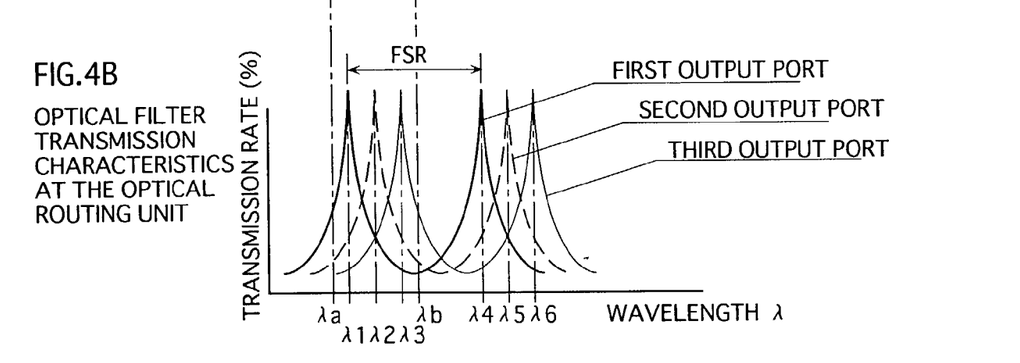
FIG. 4B shows the optical filter transmission characteristics at the optical routing unit in an optical burst transmission system in the first embodiment of the present invention.

FIG. 4B shows the optical filter transmission characteristics at the optical routing unit 107. Three transmission intensity curves are shown in this figure. In each of those three, the wavelength interval, i.e. the FSR value between the two adjacent peak transmission wavelengths are the same. Such a pair of lightwaves with the wavelengths λ1 and λ4 is guided to the first output port; Such a pair of lightwaves with the wavelengths λ2 and λ5 is guided to the second output port; and such a pair of lightwaves with the wavelengths λ3 and λ6 is guided to the third output port.

Since the first wavelength band of the data light and the second wavelength band of the clock light are set so that they don't overlap each other, there is no output of data light and clock light with inappropriate wavelengths that could interfere with the data light and the clock light with appropriate wavelengths at each of the output ports of the optical routing unit 107; therefore, it is possible to transmit data in high quality.

Figure 4C:
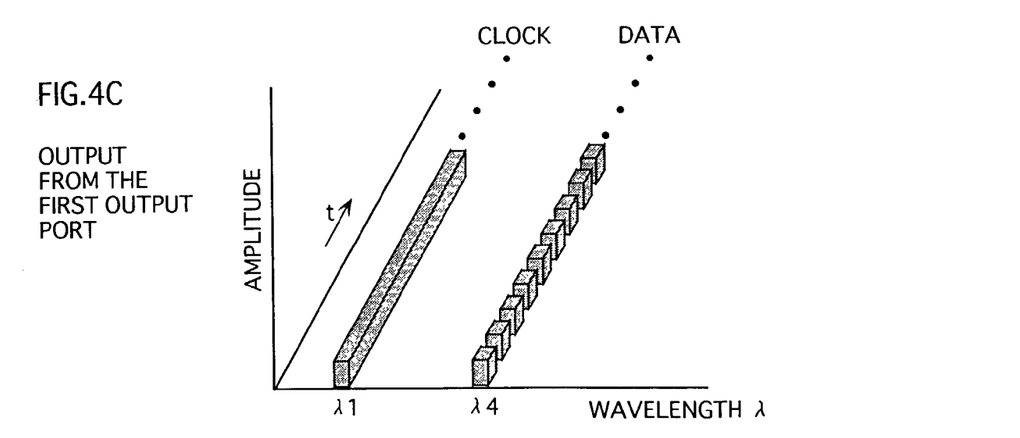
FIG. 4C shows the wavelength characteristics of the lightwaves outputted from the first output port of the optical routing unit in an optical burst transmission system in the first embodiment of the present invention.

FIG. 4C shows the wavelength characteristics of the lightwaves outputted from the first output port.

Because of the aforementioned features of the optical routing unit 107, only such lightwaves with the wavelengths λ1 and λ4 are outputted from the first output port.

Here, the lightwave with the wavelength λ1 is clock light and the lightwave with the wavelength λ4 is data light.

Operation

The following is an explanation of the operation in the optical burst transmission system 100.

Figure 5:
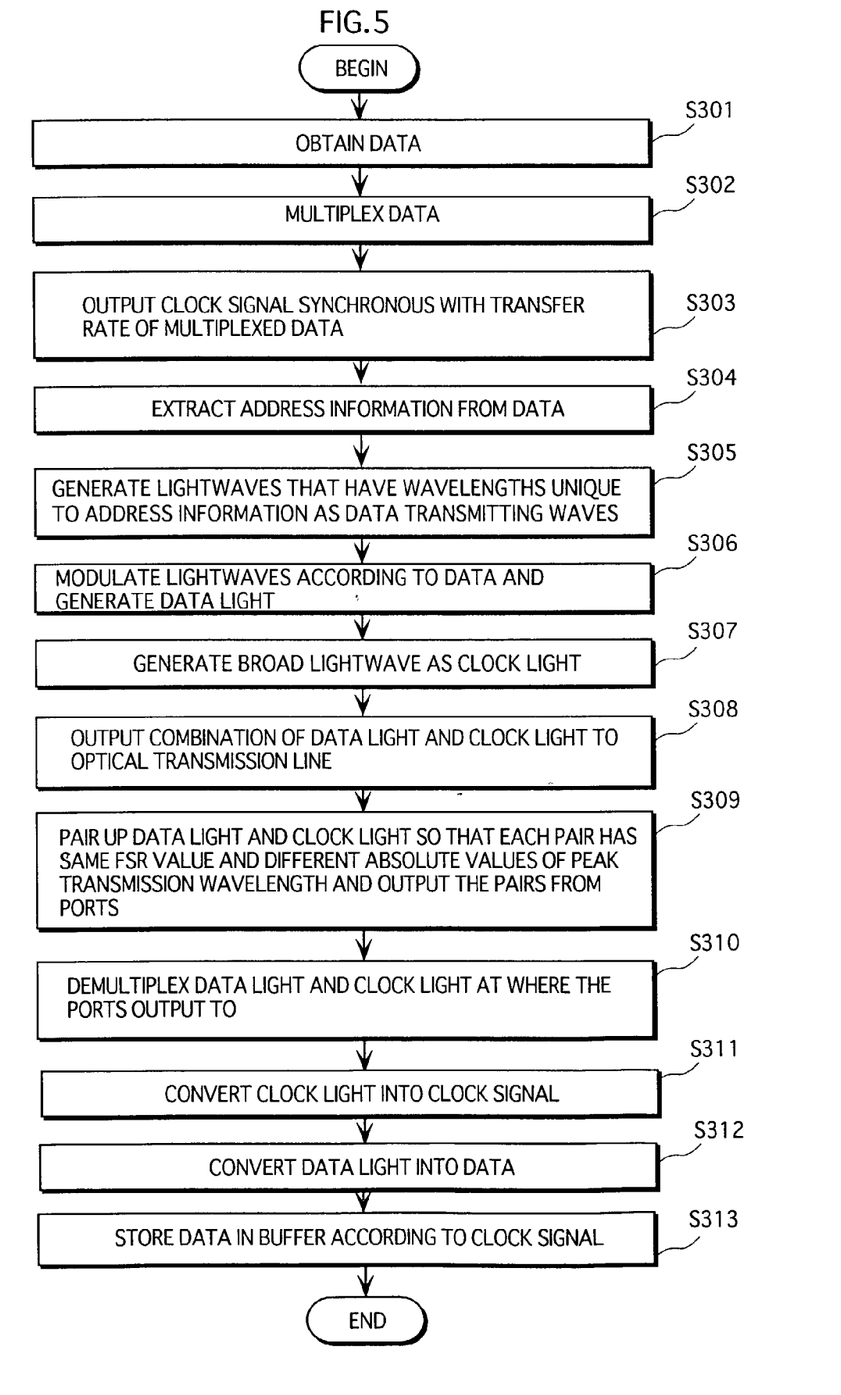
FIG. 5 is a flowchart to show the processing in an optical burst transmission system in the present invention.

FIG. 5 is a flowchart to show the processing in the optical burst transmission system 100.

For example, the multiplexing unit obtains 3 pieces of data in sequence from the buffer 201, the buffer 202 and the buffer 203 (Step S301), and makes them into one stream data by multiplexing them (Step S302).

The multiplexing unit 101 then outputs a clock signal that is synchronous with the transfer rate of the multiplexed stream data to the broad spectrum optical generator 105 (Step S303).

The address extracting unit 102 extracts address information to show the destinations of each data from the packet header of the stream data and outputs the address information to the optical generator 103 (Step S304).

Each of the data stored in the buffer 201, the buffer 202 and the buffer 203 has different destinations.

The optical generator 103 then generates such lightwaves each of which has a wavelength that is unique to each of the destinations indicated by the address information, for example λ4, λ5, and λ6, so that the lightwaves function as data transmitting waves (Step S305) and outputs the lightwaves to the optical modulator 104.

The optical modulator 104 receives the stream data from the address extracting unit 102 and modulates the intensity of the lightwaves outputted from the optical generator 103 according to the signal in this stream data, and outputs the lightwaves as "data light" (Step S306).

The broad spectrum optical generator 105 modulates the intensity of the clock signal received, and outputs, as clock light, such a broad lightwave that has the second wavelength band so that the lightwave functions as a transmitting wave of the clock signal (Step S307).

The optical multiplexer 106 multiplexes the data light and the clock light and outputs the multiplexed combination to an optical transmission line (Step S308).

The optical routing unit 107 guides such lightwaves with three pairs of wavelengths, among which each pair has the same FSR value and yet the absolute values of the peak transmission wavelengths are different from each other, to three different output ports respectively (Step S309).

Consequently, such lightwaves with the wavelengths λ1 and λ4 is guided to the first output port; such lightwaves with the wavelengths λ2 and λ5 is guided to the second output port; and such lightwaves with the wavelengths λ3 and λ6 is guided to the third output port.

The wavelengths have been set so that λa<λ1, λ2, λ3<λb<λ4, λ5 λ6 holds true.

The first optical demultiplexer 121, the second optical demultiplexer 131 and the third optical demultiplexer 141 demultiplex the multiplexed combination of data light and clock light that they have received, and output the data light to each of the corresponding data detecting units and the clock light to each of the corresponding clock detecting units respectively (Step S310).

The first clock detecting unit 122, the second clock detecting unit 132, and the third clock detecting unit 142 convert the received clock light into an electric signal i.e. a clock signal (Step S311).

The first data detecting unit 123, the second data detecting unit 133 and the third data detecting unit 143 convert the received data light into an electric signal and reproduce each data (Step S312).

The converted data are stored in a buffer upon having been recognized as each data according to the clock signals received from the first clock detecting unit 122, the second clock detecting unit 132, and the third clock detecting unit 142 (Step S313).

Thus, according to the first embodiment of the present invention, only one broad spectrum light source (such as an LED) is needed as a light source for generating clock light in the optical burst transmission system; therefore, the costs do not increase very much even if the number of receiving terminals increases.

The optical generator 103 in the first embodiment in the present invention is presented as a DBR (Distributed Bragg Reflector) laser; however, it could also be an SSG (Super Structure Grating)-DBR laser, an SG (Sampled Grating)-DBR laser, or a GCSR (Grating-assisted Codirectional Coupler with Sampled Reflector) laser.

Additionally, the broad spectrum optical generator 105 is presented as having an LED that emits lightwaves with a broad wavelength band, but it could also be an SLD (Super Luminescent Diode), or an ASE (Amplified Spontaneous Emission)of an EDFA (Erbium Doped Fiber Amplifier).

Besides, the first embodiment of the present invention presents an example in which data is transmitted to the three receiving units, the first receiving unit 120, the second receiving unit 130 and the third receiving unit 140; however, it could also be arranged so that data is transmitted to S pieces of receiving units wherein S is an arbitrary natural number. In such a case, the optical routing unit 107 guides lightwaves with S pairs of wavelengths to S pieces of output ports respectively.

Furthermore, the light intensity of clock light is expressed as 1/S, and if S increases, there is a limit to the light intensity which one light emitting device such as an LED can provide. Consequently, it is also acceptable to arrange so that the number of light emitting devices to be used is smaller than the number S in order to maintain a light intensity that is detectable at the receiving units.

In the prior art, S pieces of light emitting devices are necessary in such a case; however, in the present invention, the number of light emitting devices could be smaller than the number S, needless to say.

In addition, in case that the number of light emitting devices is smaller than the number S, it is also acceptable to assign a segment of the second wavelength band to each of a plurality of light emitting devices, instead of assigning the whole second wavelength band to one light emitting device. In such a case, there is more flexibility in determining the number of light emitting devices.

Moreover, FIG. 4B presents an example in which the optical routing unit 107 renders three transmission intensity curves; however, if the number of the receiving units connected to the optical routing unit 107 increases, namely if the first wavelength band for the data light and the second wavelength band for the clock light both become broader, then it is also acceptable to arrange so that the bandwidths of the first wavelength band and the second wavelength band are almost the same, and yet both are not more than or almost equal to the FSR value. This way it is possible to more effectively utilize the transmission intensity of the optical routing unit and to transmit data to more number of receiving units.

Earlier in the first embodiment of the present invention, it is presented that the optical routing unit 107 has features to guide to the first output port only such lightwaves with the wavelengths λ1 and λ4, and that the interval between the wavelengths λ1 and λ4 is an FSR interval; however, it is also acceptable if the interval between the wavelengths λ1 and λ4 is an interval expressed as "FSR multiplied by M" (wherein M is a natural number).

In other words, the optical routing unit usually has features to filter not only lightwaves having two adjacent peak transmission wavelengths but also lightwaves having any two peak transmission wavelengths as the peak transmission wavelengths repeatedly and periodically appear at FSR intervals; therefore, it is possible to have the same effect as presented earlier in the first embodiment even if the interval between the wavelengths λ1 and λ4 is an interval expressed as "FSR multiplied by M".

Second Embodiment

The following is a detailed explanation of the second embodiment of the present invention.

Like the first embodiment, the second embodiment also presents an optical burst transmission system 400 that converts electric signals into optical signals in order to transfer data at high speed and in a large quantity.

Figure 6:
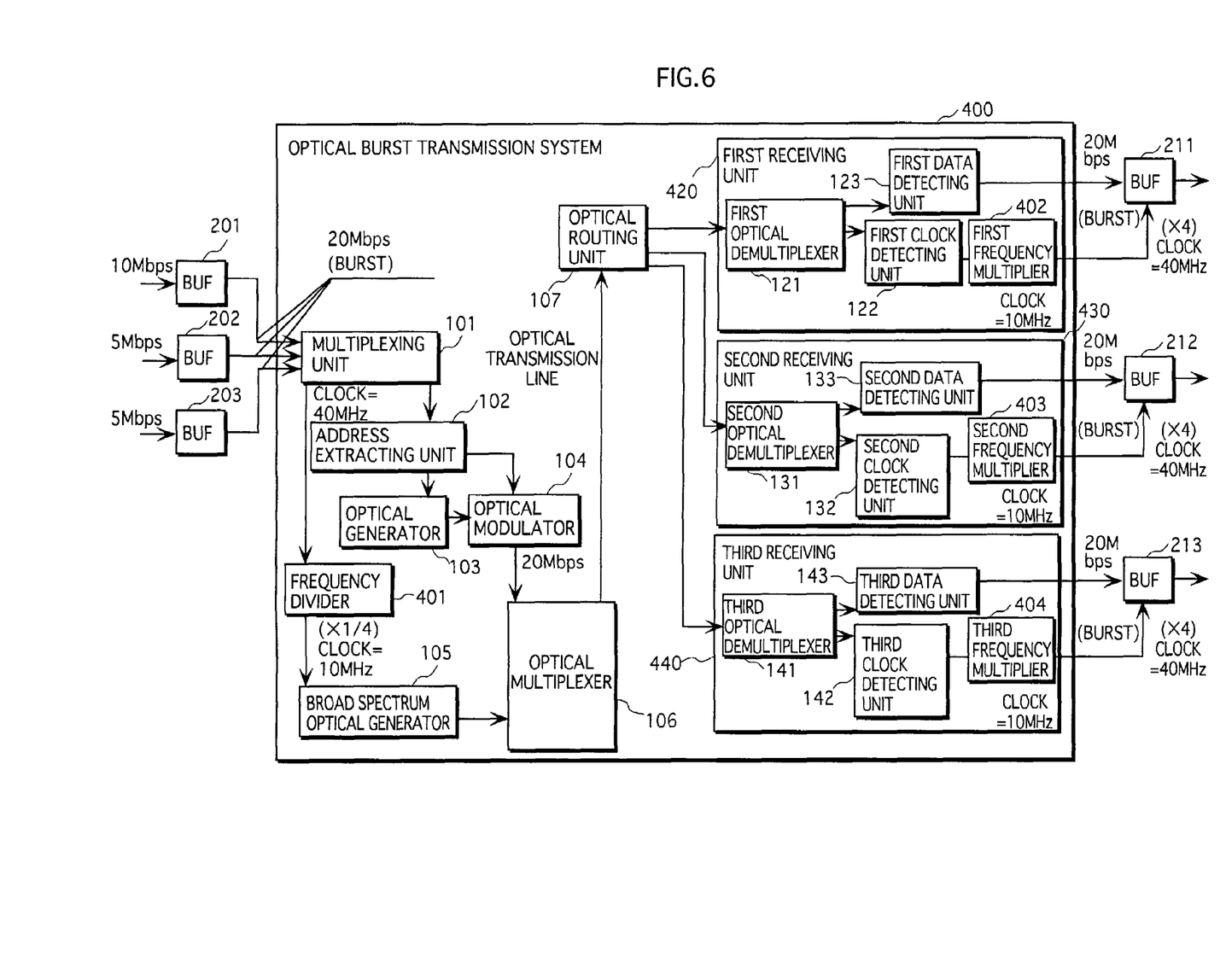
FIG. 6 is a functional block diagram of an optical burst transmission system in which the costs of the broad spectrum optical generator can be further reduced.

FIG. 6 is a functional block diagram of the optical burst transmission system 400 in which the costs of the broad spectrum optical generator 105 can be further reduced.

FIG. 6 is used to explain the differences from the first embodiment.

The optical burst transmission system 400 differs from the optical burst transmission system 100 in that it further comprises a frequency divider 401, a first frequency multiplier 402, a second frequency multiplier 403, and a third frequency multiplier 404. The frequency divider 401 divides the frequency of each of the clock signals outputted from the multiplexing unit 101 into ¼, for example, and outputs the clock signals with the reduced frequency to the broad spectrum optical generator 105. The first frequency multiplier 402, the second frequency multiplier 403, and the third frequency multiplier 404 multiply by four the frequency of the clock signals received from each of the first clock detecting unit 122, the second clock detecting unit 132, and the third clock detecting unit 142, and output the clock signals with the multiplied frequency.

This way, the frequency of the clock signals being transmitted in the form of lightwaves is reduced, and the frequency of the clock signals after being converted into electric signals is restored to the normal frequency.

Because the frequency of the clock light outputted from the broad spectrum optical generator 105 is reduced, it is possible to adopt less expensive components for the broad spectrum optical generator 105, the first clock detecting unit 122, the second clock detecting unit 132, and the third clock detecting unit 142, since the band required for their operations is less restricted.

In conclusion, the optical burst transmission system 400 can have less expensive devices in it because the performance i.e. the band required for the operations of the light devices for transmitting clock light is less restricted, by comprising the frequency divider 401, the first frequency multiplier 402, the second frequency multiplier 403 and the third frequency multiplier 404 in order to divide the frequency of each of the clock signals before they get transmitted in lightwaves and then multiply the frequency after the clock signals get transmitted so that the clock signals can be reproduced as before.

Although in the second embodiment of the present invention, the frequency divider 401 divides the frequency of each of the clock signals into ¼, and the first frequency multiplier 402, the second frequency multiplier 403, and the third frequency multiplier 404 multiply the frequency of each of the clock signals by 4, note here that it is also acceptable to divide the frequency into another number such as ⅛ or 1/16, and to multiply the frequency by another number such as 8 or 16.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical burst transmission system that transmits lightwaves having a plurality of pieces of data therein through transmission lines to destinations of the plurality of pieces of data, comprising:
   a data obtaining means for obtaining the plurality of pieces of data in sequence;
   a first optical signal generating means for generating Type 1 lightwaves from each piece of the data obtained, each Type 1 lightwave having a Type 1 wavelength that is unique to and corresponds to each of the destinations of each piece of the data, and having undergone an intensity modulation process according to a data value of each piece of the data;
   a second optical signal generating means for generating, by incorporating at least Type 2 lightwaves, a Type 3 lightwave using a smaller number of light emitting devices than the number of the Type 1 lightwaves generated by the first optical signal generating means, each of the Type 2 lightwaves (i) having a Type 2 wavelength that corresponds to each Type 1 wavelength and is apart from each Type 1 wavelength with an interval expressed as "FSR multiplied by M", wherein the FSR stands for Free Spectral Range and M is a natural number and (ii) having undergone the intensity modulation process according to a clock signal corresponding to the plurality of pieces of data;
   an outputting means for outputting a combination of the Type 1 lightwaves and the Type 3 lightwave;
   an optical routing means for receiving the combination of the lightwaves and extracting pairs of the lightwaves from the combination so that each pair is made up of one Type 1 lightwave and one particular Type 2 lightwave having the Type 2 wavelength, and guiding each pair to each of the transmission lines that is unique to and respectively corresponds to each of the Type 1 wavelengths of the Type 1 lightwaves extracted.

2. The optical burst transmission system of claim 1, wherein
   the Type 3 lightwave includes a lightwave having a wavelength band covering all wavelengths from a minimum Type 2 wavelength to a maximum Type 2 wavelength.

3. The optical burst transmission system of claim 1, wherein
   each of the light emitting devices used by the second optical signal generating means generates two or more Type 2 lightwaves having different wavelengths.

4. The optical burst transmission system of claim 1, wherein
   the number of the light emitting devices used by the second optical signal generating means is one.

5. The optical burst transmission system of claim 1 further comprising:
   a frequency dividing means for dividing a frequency of the clock signal into 1/N, wherein N is a natural number; and
   a reproducing means for (i) receiving the pair made up of the Type 1 lightwave and the Type 2 lightwave via one of the transmission lines, (ii) multiplying by N the frequency of the clock signal transmitted in the Type 2 lightwave, and (iii) reproducing the plurality of pieces of data by discriminating each piece of the data transmitted in the Type 1 lightwave using the clock signal whose frequency has been multiplied, wherein each of the Type 2 lightwaves incorporated into the Type 3 lightwave by the second optical signal generating means has undergone the intensity modulation process according to the clock signal whose frequency had been divided by the frequency dividing means.

6. The optical burst transmission system of claim 1, wherein
the first optical signal generating means generates the Type 1 lightwaves using a Distributed Bragg Reflector Laser, a Super Structure Grating Distributed Bragg Reflector Laser, a Sampled Grating Distributed Bragg Reflector Laser, or a Grating-assisted Codirectional Coupler with Sampled Reflector Laser as a light source that includes the light emitting devices.

7. The optical burst transmission system of claim 1, wherein
the second optical signal generating means generates the Type 3 lightwave using a Super Luminescent Diode, a Light Emission Diode, or an Amplified Spontaneous Emission of an Erbium Doped Fiber Amplifier as the light emitting devices.

8. The optical burst transmission system of claim 1, wherein
the optical routing means comprises an Arrayed Waveguide Grating and extracts the pairs of the lightwaves by using the Arrayed Waveguide Grating.

9. An optical burst transmission apparatus transmitting a combination of lightwaves to a component that (a) receives the combination of lightwaves, (b) extracts pairs of the lightwaves from the combination so that each pair is made up of (i) one Type 1 lightwave having a Type 1 wavelength that is unique to and corresponds to a transmission line leading to a destination of each of a plurality of pieces of data and (ii) one particular Type 2 lightwave having a Type 2 wavelength that corresponds to the Type 1 wavelength and is apart from the Type 1 wavelength with an interval expressed as "FSR multiplied by M", wherein the FSR stands for Free Spectral Range and M is a natural number, and (c) guides each pair to each transmission line that is unique to and respectively corresponds to each Type 1 wavelength of the Type 1 lightwaves extracted, the optical burst transmission apparatus comprising:
a data obtaining means for obtaining the plurality of pieces of data in sequence;
a first optical signal generating means for generating the Type 1 lightwaves from each piece of the data obtained, each Type 1 lightwave having the Type 1 wavelength that is unique to and corresponds to each destination of each piece of the data, and having undergone an intensity modulation process according to a data value of each piece of the data;
a second optical signal generating means for generating, by incorporating at least the Type 2 lightwaves, a Type 3 lightwave using a smaller number of light emitting devices than the number of the Type 1 lightwaves generated by the first optical signal generating means, each of the Type 2 lightwaves having the Type 2 wavelength that corresponds to each Type 1 wavelength, and having undergone the intensity modulation process according to a clock signal corresponding to the plurality of pieces of data;
an outputting means for outputting the combination of the Type 1 lightwaves and the Type 3 lightwave to the component.

10. The optical burst transmission apparatus of claim 9, wherein
the Type 3 lightwave includes a lightwave having a wavelength band covering all wavelengths from a minimum Type 2 wavelength to a maximum Type 2 wavelength.

11. The optical burst transmission apparatus of claim 9, wherein
each of the light emitting devices used by the second optical signal generating means generates two or more Type 2 lightwaves having different wavelengths.

12. The optical burst transmission apparatus of claim 9, wherein
the number of the light emitting devices used by the second optical signal generating means is one.

13. The optical burst transmission apparatus of claim 9 further comprising:
a frequency dividing means for dividing a frequency of the clock signal into 1/N, wherein N is a natural number,
wherein each of the Type 2 lightwaves incorporated into the Type 3 lightwave by the second optical signal generating means has undergone the intensity modulation process according to the clock signal whose frequency had been divided by the frequency dividing means.

14. The optical burst transmission apparatus of claim 9, wherein
a minimum Type 1 wavelength is apart from a maximum Type 1 wavelength with an interval either equal or subequal to the FSR.

15. The optical burst transmission apparatus of claim 9, wherein
a minimum Type 1 wavelength is apart from a maximum Type 1 wavelength with an interval either equal to or smaller than the FSR.

16. The optical burst transmission apparatus of claim 9, wherein
the first optical signal generating means generates the Type 1 lightwaves using a Distributed Bragg Reflector Laser, a Super Structure Grating Distributed Bragg Reflector Laser, a Sampled Grating Distributed Bragg Reflector Laser, or a Grating-assisted Codirectional Coupler with Sampled Reflector Laser as a light source that includes the light emitting devices.

17. The optical burst transmission apparatus of claim 9, wherein
the second optical signal generating means generates the Type 3 lightwave using a Super Luminescent Diode, a Light Emission Diode, or an Amplified Spontaneous Emission of an Erbium Doped Fiber Amplifier as the light emitting devices.

18. An optical burst transmission method for transmitting lightwaves that have a plurality of pieces of data therein through transmission lines to destinations of the plurality of pieces of data, comprising:
a data obtaining step for obtaining the plurality of pieces of data in sequence;
a first optical signal generating step for generating Type 1 lightwaves from each piece of the data obtained, each Type 1 lightwave having a Type 1 wavelength that is unique to and corresponds to each of the destinations of each piece of the data, and having undergone an intensity modulation process according to a data value of each piece of the data;

a second optical signal generating step for generating, by incorporating at least Type 2 lightwaves, a Type 3 lightwave using a smaller number of light emitting devices than the number of the Type 1 lightwaves generated in the first optical signal generating step, each of the Type 2 lightwaves (i) having a Type 2 wavelength that corresponds to each Type 1 wavelength and is apart from each Type 1 wavelength with an interval expressed as "FSR multiplied by M", wherein the FSR stands for Free Spectral Range and M is a natural number and (ii) having undergone the intensity modulation process according to a clock signal corresponding to the plurality of pieces of data;

an outputting step for outputting a combination of the Type 1 lightwaves and the Type 3 lightwave to optical transmission lines;

an optical routing step for receiving the combination of the lightwaves via the optical transmission lines and extracting pairs of the lightwaves from the combination so that each pair is made up of one Type 1 lightwave and one particular Type 2 lightwave having the corresponding Type 2 wavelength, and guiding each pair to each of the transmission lines that is unique to and respectively corresponds to each of the Type 1 wavelengths of the Type 1 lightwaves extracted.

* * * * *